March 10, 1953  S. L. GOOKIN  2,630,935
EYELET JOINT AND METHOD OF FORMING SAME
Filed May 4, 1950
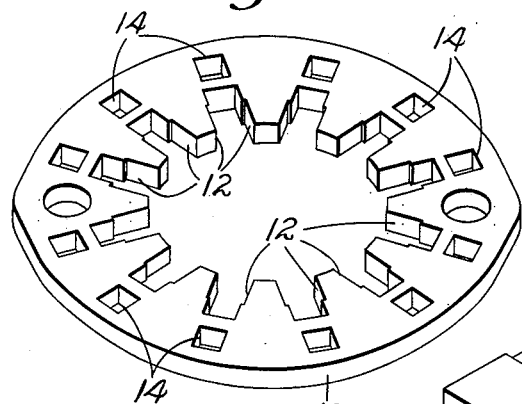
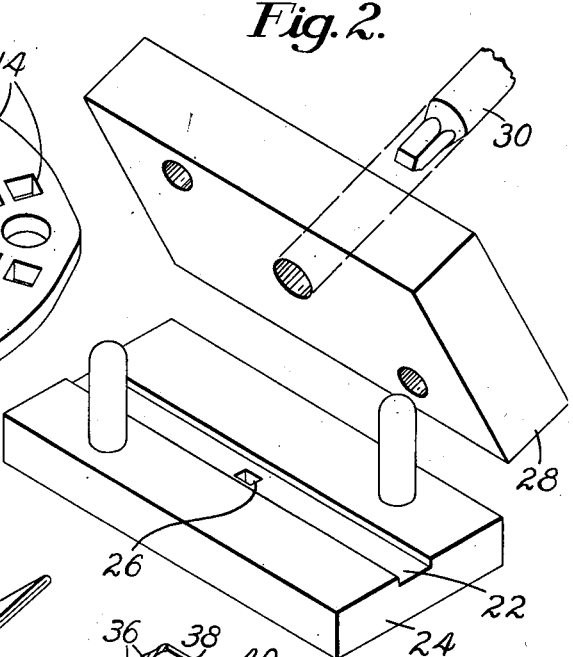
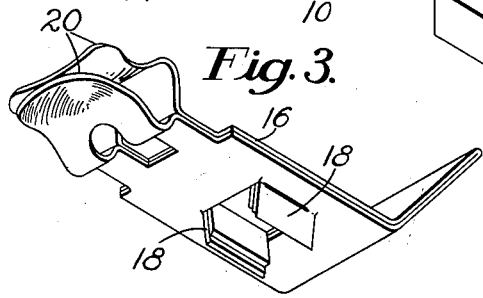
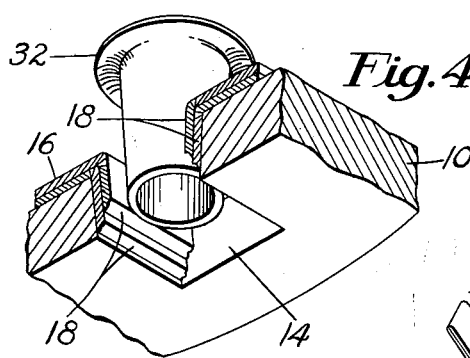
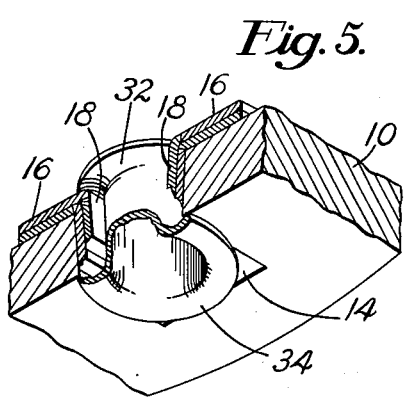
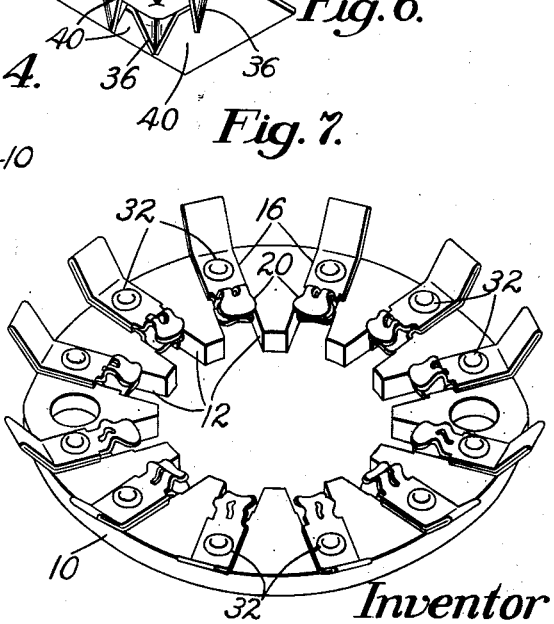
Inventor
Sylvester L. Gookin
By his Attorney Patented Mar. 10, 1953

2,630,935

UNITED STATES PATENT OFFICE 2,630,935

EYELET JOINT AND METHOD OF FORMING SAME

Sylvester L. Gookin, Quincy, Mass., assignor to United Shoe Machinery Corporation, Flemington, N. J., a corporation of New Jersey Application May 4, 1950, Serial No. 159,999

6 Claims. (Cl. 218—29)

This invention relates to a method of assembling articles, and more particularly to a method of securing electrical contacts to insulators by means of an eyelet joint. While the invention is hereinafter exemplified in an eyelet joint and a method of joining the contact and insulator parts of a selector switch, it will be apparent that application of the invention is not so limited but may well involve other forms of tubular fasteners and be employed in assembling many other types and shapes of articles whether they be used for electrical work or otherwise.

Frequently two members must be assembled in such a way that, though only a flat side of each bears on the other member, they will be affixed and prevented from relative turning movement. Such pivotal movement is readily avoided, of course, when two or more eyelets or other fasteners are inserted. In radio, television and other fields wherein many millions of tubular fasteners are used annually, however, the trend is toward smaller operating sets which accordingly require the use of smaller assemblies having still smaller component parts. Assemblage of these smaller parts, especially the delicate and precision items, becomes more difficult because of the limited holding surfaces available. Where two eyelets were formerly used to affix one element to another, space is now frequently found for only a single eyelet. This situation imposes a heavy duty on the single eyelet and it is found in many instances that setting the ordinary circular-barreled eyelet in correspondingly shaped holes may not provide adequate resistance to relative turning of the parts.

In electrical components, for example, especial need has developed for an easily assembled low-cost joint suitable to affix a metal piece to an insulator. The slightest relative turning of a contact when unintended usually varies electrical resistance and produces, for example, poor radio or television reception or has other detrimental consequences. The difficulties of obtaining the tight joint permitting no relative turning are attributable to the seemingly impossible task of attaining dimensional uniformity in any of the components, i. e. in the hole punched in the insulator, which is usually of frangible material, in the hole punched in the contact, and in the tubular fastener itself. Individually they inevitably differ from prescribed standards or from dimensions otherwise specified and consequently some means of compensating for and overcoming these difficulties when the parts are being assembled is highly desirable.

It has hitherto been proposed to punch matching holes in an insulator and contact respectively in order that an eyelet having a barrel with a square-shaped section might be inserted and upset therein. Experience has shown that such a joint is quite strong and does oppose relative turning to some extent. Square-barreled eyelets, however, are more costly than the ordinary eyelets having tapered cylindrical barrels, and it is more difficult to manufacture and rapidly set square-barreled eyelets with a high degree of uniformity, thus occasionally permitting play in a critical joint.

In view of the above, a primary object of this invention is to provide an improved joint by which one member is affixed to another and for securing said members against relative turning, said joint to comprise but a single tubular fastener.

In accordance with this object an important feature of the invention resides in a joint comprising a member having a non-circular hole formed therein, a second member superposed on the first and having angularly related or oppositely disposed portions projecting within said hole, and an eyelet upset to clench said members together while wedging said portions into contact with the walls of said hole.

The above and other features of the invention will now be more fully described in connection with one illustrative embodiment and the accompanying drawings, in which Fig. 1 is a perspective of the circular insulator disc of a selector to which a series of contacts is to be attached by means of the joint of this invention;

Fig. 2 is a perspective of a punch and cooperating dies disassembled and disclosing one means of providing projections in a metallic strip;

Fig. 3 is an enlarged perspective of a contact member ready for assembly in the joint to be formed, said member having been pierced by instruments such as shown in Fig. 2;

Fig. 4 is a further enlarged perspective of a portion of the insulator disc and contact member superposed, an eyelet or tubular rivet being partially inserted;

Fig. 5 is another perspective showing a portion of the joint as formed when the fastener has been upset;

Fig. 6 is a perspective of an alternate shape of prongs projecting from a single thickness portion of a contact member; and Fig. 7 shows the disc and contact parts assembled.

A disc 10 (Fig. 1) may be of Bakelite or other insulating sheet material which has been punched or otherwise formed with evenly-spaced radial slots 12 and their respective rectangular, and preferably, square holes 14. Electric contact members 16 such as the one seen in Fig. 3 are to be disposed in the respective slots 12 and each member 16 is provided with yieldable projections or prongs 18 to be securely anchored against turning relative to the disc 10.

Fig. 2 indicates one means of providing the projections 18 which are preferably inclined toward one another. While a single thickness of metallic strip, preferably silverplated beryllium copper, would be satisfactory for forming a contact member 16, it is usually preferable and customary to feed, fold, form and cut the flat strip successively to provide contact members of double thickness and each having its contact end portions 20 sprung apart. If, for example, the projection forming means of Fig. 2 be used, the flat folded strip may be fed in a groove 22 formed in a die 24. A V-shaped forming recess 26 having dimensions corresponding with the sides of the holes 14 is formed centrally in the groove 22. A guiding die 28 normally covering the groove 22 is apertured to receive a piercing punch 30 which is reciprocated in timed relation to the feeding of the contact strip by power means not shown. It will be noted that the piercing end of the punch is also V-shaped to be received by the recess 26 and thereby accurately to impart the desired size, shape and inclination to the projections 18. The latter preferably extend from the body of the contact 16 less than the extent of the depth of a hole 14.

The next step in assembling the joint is to place the contact 16 on the disc 10, the projections 18 extending snugly into a hole 14 for engagement with its walls and the contact portions 20 extending toward the center of the disc. As viewed in Fig. 4, a tubular fastener in the form of an eyelet 32 is then inserted in the reduced rectangular space between the opposing spaced prongs 18. The eyelet 32 is preferably provided with a tapered cylindrical barrel that has its maximum diameter adjacent to the preformed crown and equal to, or, when frangible material is not involved, slightly larger than the maximum initial distance between the projections 18. The important consideration is that the size of the barrel shall be sufficient to cause the eyelet 32, when later upset, to grip and hold the projections 18 between the barrel and the walls of the hole 14. Normally the end of the eyelet having the smaller barrel diameter is inserted by machine or manually from the same side of the hole 14 as the projections 18, and as insertion progresses the projections 18 are wedged tightly against opposite and adjacent walls of the disc hole 14.

The final step in forming the joint is to upset the inserted eyelet by means of customary upsetting tools. This action holds the pre-formed crown of the eyelet in engagement with the contact 16 while the smaller end of the eyelet barrel is expanded and flared to form a flange 34 bearing against the insulating disc 10 as viewed in Fig. 5. As the eyelet clenching pressure draws the contact 16 securely into engagement with the disc, radial expansion of the eyelet barrel resulting from the upsetting urges the projections 18 into tight relation with the walls of the hole 14. The circular barrel, before upsetting, was confined in space of non-circular or rectangular section but the enforced expansion will normally require the barrel to yield and be deformed with a partially rectangular or non-circular cross section which is effective subsequently to resist turning forces applied to the contact 16. The yieldable projections 18 serve with the deformable eyelet 32 to take up the unavoidable discrepancy in dimensions found when these several elements are manufactured.

Each of the joints may be assembled as above described to provide the assembled portion of a selector switch viewed in Fig. 7 or as provided in a modified form of the invention now to be described and frequently preferred when frangible materials are involved. Referring to Fig. 6, instead of providing rectangular-shaped projections 18, angularly related prongs 36 may be punched out or otherwise formed from a strip of contact metal 38. Preferably each of the prongs 36 is triangular and non-flat and they are together disposed in generally rectangular formation, each prong occupying a corner position and being spaced to fit snugly into a corner of a hole 14. Spaces between adjoining prongs 36 are designated 40. It will be recognized that in some instances, as where large fasteners or grommets are to be used, it may be desirable to utilize prongs 36 disposed in other than rectangular formation, as hexagonal for example, and that each prong need not necessarily occupy a corner of a hole.

It should be noted that a prong 36 is not sharply right angular but has it corner portion rounded and is also rounded where adjacent to the contact 38. This prong configuration avoids incurring cracking of the strip material itself and tends to avoid fracture of the insulator or other material into which the several prongs 36 may be impressed.

A single thickness of contact 38 with corresponding thickness of prongs 36 is shown in Fig. 6, though it will be appreciated that multiple thickness of contacts and prongs may also be used when desired to magnify the difference between width and length of the hole into which the fastener will be inserted. The prongs 36 are readily formed and their depending sides generally define a square corresponding to the hole in which they are to be inserted. As with the projections 18, it is desirable that the prongs be initially inclined inwardly toward the center of the hole in which they will be inserted. This aids insertion of the apexes of the prongs 36 into the hole 14, helps to center the fastener to be installed, and provides a yieldable means by which gradual tightening of the joint may be advantageously had during assembly.

When the prongs 36 are within the hole 14, the strip 38 being pressed into suitable position on the disc 10, installation and upsetting of the circular eyelet 32 is performed as previously described to wedge the prongs against the walls of the hole. It will be apparent, however, that upon radial expansion of the eyelet barrel, peripheral portions thereof approximately 90° apart are pressed outwardly and into the four spaces 40. The tapering edges of each prong 36 then bear on the exterior of the eyelet barrel, the latter having lost its circular section by becoming firmly wedged against rotation in the clenched joint.

Having described by invention what I claim as new and desire to secure by Letters Patent of the United States is:

1. An eyelet joint comprising a first member having a hole defined by flat walls, a second member provided with a plurality of depending spaced-apart prongs positioned within and contiguously adjacent the walls of said hole, said prongs presenting flat surface portions in engagement with said walls, and a flanged tubular fastening extending through said hole and between said prongs, said fastening being radially deformed into non-circular cross section within the hole and wedging said prongs into secure engagement with their respective walls.

2. An eyelet joint comprising a first member having a hole defined by flat walls, a second member provided with a plurality of oppositely disposed depending prongs positioned within and contiguously adjacent the walls of said hole, said prongs presenting flat surface portions in engagement with said walls, and a flanged tubular fastening extending through said hole and between said prongs, said fastening being radially deformed into non-circular cross section within the hole and wedging said prongs into secure engagement with their respective walls.

3. An eyelet joint comprising a first member having a rectangular hole defined by flat walls, a second member provided with a pair of oppositely disposed depending prongs positioned within and contiguously adjacent opposite walls of said hole, said prongs being substantially co-extensive with and in engagement with said opposite walls, and a flanged tubular fastening extending through said hole and between said prongs, said fastening being radially deformed into non-circular cross section within the hole and wedging said prongs into secure engagement with their respective walls.

4. An eyelet joint comprising a first member having a hole defined by flat angularly related adjoining walls, a second member provided with a plurality of depending prongs positioned within and contiguously adjacent adjoining walls of said hole, said prongs presenting flat surface portions in engagement with said adjoining walls, and a flanged tubular fastening extending through said hole and between said prongs, said fastening being radially deformed into non-circular cross section within the hole and wedging said prongs into secure engagement with their respective walls.

5. The method of securing one member against turning movement with respect to another comprising forming a non-circular hole in one member, forming oppositely disposed projections in the second member, said projections initially being similarly inclined toward a central point and disposed in general formation corresponding with said hole, inserting said projections within the hole, and then upsetting endwise while radially dilating a circular taper-barreled eyelet in said hole to non-circular section to wedge the projections against the first said member.

6. The method of joining one member to another comprising perforating one member to provide walls in rectangular relation, piercing the second member to provide a plurality of prongs spaced in corresponding rectangular formation, placing one member on the other to locate said prongs respectively adjacent to a perforation wall, inserting a tapered tubular rivet in the perforation to wedge said prongs apart and deform the rivet barrel circumferentially, and upsetting said rivet endwise to clench the members together as the rivet barrel is expanded against said prongs.

SYLVESTER L. GOOKIN.

REFERENCES CITED

The following references are of record in the file of this patent:

UNITED STATES PATENTS

| Number | Name | Date |
|---|---|---|
| 672,884 | Bennett | Apr. 30, 1901 |
| 1,729,873 | Hengstenberg | Oct. 1, 1929 |
| 1,976,776 | Gookin | Oct. 16, 1934 |
| 2,225,801 | Schnoll | Dec. 24, 1940 |
| 2,465,654 | Millard | Mar. 29, 1949 |

FOREIGN PATENTS

| Number | Country | Date |
|---|---|---|
| 392,025 | Great Britain | May 11, 1933 |